(12) United States Patent
Choi et al.

(10) Patent No.: US 9,253,641 B2
(45) Date of Patent: Feb. 2, 2016

(54) APPARATUS AND METHOD FOR SHARING OUTPUT DATA IN PORTABLE TERMINAL

(75) Inventors: Yoon-Suk Choi, Gyeonggi-do (KR); Gi-Tae Moon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 128 days.

(21) Appl. No.: 13/409,750

(22) Filed: Mar. 1, 2012

(65) Prior Publication Data

US 2012/0252413 A1     Oct. 4, 2012

(30) Foreign Application Priority Data

Mar. 28, 2011    (KR) .......................... 10-2011-0027417

(51) Int. Cl.
*H04W 12/06*      (2009.01)
*H04W 12/08*      (2009.01)

(52) U.S. Cl.
CPC .......... *H04W 12/08* (2013.01); *H04L 2463/101* (2013.01)

(58) Field of Classification Search
CPC ............ G06Q 50/184; H04N 21/2743; H04N 21/8352; H04N 21/254; H04N 21/8166; H04W 12/00; H04W 12/06; H04W 12/08
USPC .......... 380/203, 228, 301; 713/171, 161, 193, 713/181; 455/550.1, 418, 419, 420, 414.1, 455/414.3
See application file for complete search history.

(56) References Cited

U.S. PATENT DOCUMENTS

| | | | |
|---|---|---|---|
| 2004/0148501 A1* | 7/2004 | Livaditis et al. | ............... 713/161 |
| 2008/0178001 A1* | 7/2008 | Kim | ........................ G06F 21/10 713/167 |
| 2008/0320596 A1* | 12/2008 | Wang et al. | ...................... 726/26 |
| 2011/0002461 A1* | 1/2011 | Erhart | ..................... H04L 9/302 380/44 |
| 2011/0312303 A1* | 12/2011 | Brush | ..................... H04M 3/38 455/414.1 |
| 2014/0041051 A1* | 2/2014 | Meketa et al. | .................. 726/28 |

* cited by examiner

*Primary Examiner* — Sharad Rampuria
*Assistant Examiner* — Farideh Madani
(74) *Attorney, Agent, or Firm* — Cha + Reiter, LLC.

(57) ABSTRACT

An apparatus and method for limiting sharing of reproduction information of a data authorized for only a specific user when a video and audio reproduced from a portable terminal are shared with a peripheral second terminal. The apparatus preferably includes an application analyzer, and a sharing information generator. Sharing information of the reproduced data is replaced with non-shared information when it is verified that the data which is not authorized to be shared is reproduced. A controller transmits the sharing information or the sharing information replaced with the non-shared information to the peripheral second terminal. The sharing information includes picture information and voice information of the reproduced data and wherein the non-shared information is replacement information for limiting viewing of the voice and audio information.

14 Claims, 4 Drawing Sheets

APPARATUS AND METHOD FOR SHARING OUTPUT DATA IN PORTABLE TERMINAL

CLAIM OF PRIORITY

This application claims the benefit under 35 U.S.C. §119(a) from a Korean patent application filed in the Korean Intellectual Property Office on Mar. 28, 2011 and assigned Serial No. 10-2011-0027417, the entire disclosure of which is hereby incorporated by reference in its entirety.

BACKGROUND OF THE INVENTION

1. Field of the Invention

The present invention relates to an apparatus and method for sharing a data in a portable terminal.

2. Description of the Related Art

Portable terminals have become necessities of modern life for people of all ages. Portable terminals are now being used as media devices capable of servicing wireless voice calls and exchanging information. Portable terminals have become popular because it is possible for such portable terminals to be simply carried and service wireless voice calls. Subsequently, service providers and terminal manufacturers have been competitively developing differentiated products (or services) to supplement the functions of voice calls and text messages, and sales have increased in accordance with the development of those technologies.

For example, the portable terminal has developed into a multimedia device capable of providing various services such as a phonebook, a game, a Short Message Service (SMS), an Electronic (E)-mail service, a morning call, a Motion Picture Expert Group Audio Layer-3 (MP3) player, a schedule management function, a digital camera, and a wireless Internet service.

Recently, a portable terminal which provides a function for sharing an output of data with other portable terminals was released.

The sharing function results in a terminal "A" being controlled by a terminal "B". Data reproduced at the A terminal and an application executed at the A terminal are simultaneously output on a screen of the B terminal.

Accordingly, a user of the B terminal may execute a data to be reproduced among data items stored in the A terminal.

In accordance with the aforementioned sharing function for sharing the output data, a portable terminal which reproduces a data provides picture information and voice information of the reproduced data to a sharing terminal which is positioned around the portable terminal. The sharing terminal which receives the picture information and the voice information reproduces the received information to share the output data in real time.

However, as the portable terminal provides picture information and voice information of an executed data to the sharing terminal immediately (real time) according to the aforementioned function, there is a problem in that the portable terminal which provides the information also shares information comprising a data which is not authorized to be shared and the sharing terminal also reproduces the data which is not authorized to be reproduced.

For example, when a data in which Digital Rights Management (DRM) is set is stored in the A terminal, it is impossible to reproduce the data at the B terminal.

However, when the A terminal reproduces a data in which DRM is set in a state where it is shared with the B terminal, it provides picture information and voice information about the reproduced data in which the DRM is set to the B terminal as it is.

For this reason, there is a problem in that it is possible for the B terminal to reproduce the received data and share the data in which the DRM is set even though only the A terminal was authorized to access such data.

Accordingly, at least in order to solve the problem, there is a need for an apparatus and method for limiting the sharing of a data which is not authorized to be shared in a portable terminal which shares output data in real time.

SUMMARY OF THE INVENTION

An exemplary aspect of the present invention is to provide an apparatus and method for limiting the sharing of a data which is not authorized to be shared by a portable terminal which has functionality that shares an output data in real time.

Another exemplary aspect of the present invention is to provide an apparatus and method for replacing shareable information with limited-sharing information and providing the limited sharing information in a portable terminal when reproducing a data which is not authorized to be shared with other terminals.

Another exemplary aspect of the present invention is to provide an apparatus and method for ending execution of an application which is not authorized to be shared in a portable terminal which shares an output data in real time.

In accordance with an exemplary aspect of the present invention, an apparatus for sharing an output data in a portable terminal is provided. The apparatus preferably includes an application analyzer that verifies whether a data which is not authorized to be shared is reproduced when the output data is exchanged, a sharing information generator that generates sharing information of a reproduced data when it is verified that the data which is authorized to be shared is reproduced by the application analyzer and replacing the sharing information of the reproduced data with limiting (non-shared) information when it is verified that the data which is not authorized to be shared is reproduced, and a controller for transmitting the sharing information or the sharing information replaced with the non-shared information to a peripheral terminal, wherein the sharing information includes picture information and voice information of the reproduced data and wherein the non-shared information is replacement information for non-shared viewing of the picture information and information for non-shared listening of the voice information.

In accordance with another exemplary aspect of the present invention, a method of sharing an output data in a portable terminal is provided. The method preferably includes verifying whether a data which is not authorized to be shared is reproduced when the output data is exchanged, providing sharing information of a reproduced data to a peripheral terminal when the data which is authorized to be shared is reproduced, and replacing the sharing information of the reproduced data with non-shared information when the data which is not authorized to be shared is reproduced and providing the non-shared information to the peripheral terminal, wherein the sharing information includes picture information and voice information of the reproduced data and wherein the non-shared information is replacement information for limiting viewing of the picture information and information for limiting listening of the voice information.

Other exemplary aspects, advantages and salient features of the invention will become more apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will be more appreciated by a person of ordinary skill in the art from the following detailed description taken in conjunction with the accompanying drawings, in which.

Throughout the drawings, like reference numerals will be understood to refer to like parts, components and structures.

DETAILED DESCRIPTION

Exemplary embodiments of the present invention will now be described herein below with reference to the accompanying drawings. In the following description, well-known functions or constructions may not be described in detail when such well-known functions or constructions would obscure an artisan's appreciation of the present invention by including that which is already known.

Hereinafter, a description will be given with respect to an apparatus and method for replacing sharing information with non-shared information and providing the non-shared information when reproducing a data which is not authorized to be shared in order to limit sharing of such data in a portable terminal according to the present invention.

Figure 1:
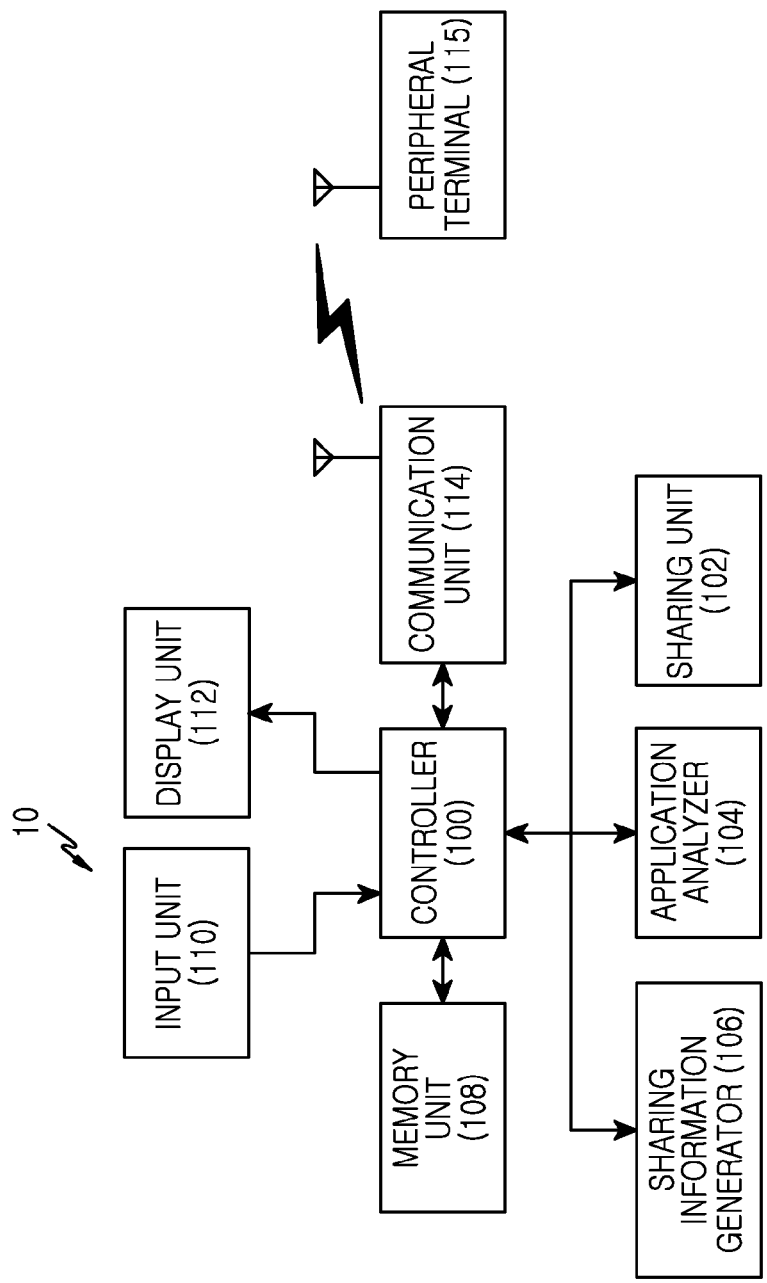
FIG. 1 is a block diagram illustrating a structure of a portable terminal for providing a picture control sharing function according to an exemplary embodiment of the present invention.

FIG. 1 is a block diagram illustrating a structure of a portable terminal 10 for providing a picture control sharing function according to an exemplary embodiment of the present invention.

Referring now to FIG. 1, the portable terminal preferably includes a controller 100, a sharing unit 102, an application analyzer 104, a sharing information generator 106, a memory unit 108, an input unit 110, a display unit 112, and a communication unit 114. The portable terminal may include additional units that are not illustrated here for sake of clarity. Similarly, the functionality of two or more of the above units may be integrated into a single component.

The controller 100 of the portable terminal controls an overall operation of the portable terminal. For example, the controller 100, which includes at least one of a processor or microprocessor, processes and controls conventional voice telephone calls and also controls data communication in accordance with the present invention. In addition to a conventional function, the controller 100 limits sharing of a data which is authorized for use of only a specific person (e.g., a data in which DRM is set) when sharing an output data with a peripheral terminal 115 according to the present invention. In other words, when the data in which the DRM is set is reproduced in a state where the portable terminal is connected with the peripheral terminal, the controller 100 replaces sharing information of the data in which the DRM is set with non-shared information and provides the non-shared information to the peripheral terminal. Herein, the sharing information is picture information and voice information of data reproduced at the portable terminal. The limit information is replacement information for non-shared viewing of the picture information and information for non-shared listening of the voice information. The limit information includes a mosaic picture, a black picture, mute information, etc.

The sharing unit 102 performs a sharing process of data of the portable terminal with the peripheral terminal for sharing the output data under control of the controller 100. In other words, the sharing unit 102 may exchange authentication information with the peripheral terminal and may perform the sharing process using local area communication technology.

The application analyzer 104 determines whether or not an application and a data executed at the portable terminal are authorized to be shared. The sharing information generator 106 replaces sharing information, about a data which is not authorized to be shared, determined by the application analyzer 104 with non-shared (i.e. limit) information.

With continued reference to FIG. 1, the memory unit 108, which is a non-transitory machine readable medium, preferably includes a Read Only Memory (ROM), a Random Access Memory (RAM), and a flash ROM, just to name some possible memory types. The ROM stores a microcode of a program, by which the controller 100, the sharing unit 102, the application analyzer 104, and the sharing information generator 106 are processed and controlled, and a variety of reference data.

With further regard to the memory unit 108, the RAM is a working memory of the controller 100 and stores a temporary data that is generated while a variety of programs are performed. Also, the flash ROM stores a variety of rewritable data, such as phonebooks, outgoing messages, and incoming messages. In addition, the memory unit 108 stores limit information to be replaced with sharing information and information about an authorized application and an authorized data.

The input unit 110 preferably includes numeral key buttons of '0' to '9' and a plurality of function keys such as, for example, a menu button, a cancel button, an OK button, a talk button, an end button, an Internet access button, a navigation key (or directional key) button, and a character input key. The input unit 110 provides a key input data corresponding to a key pushed by a user to the controller 100. If the input unit comprises a touchscreen, then such a touchscreen can serve as both an input unit and a display.

The display unit 112 displays status information which is generated while the portable terminal is operated, characters, large volumes of moving and still pictures, etc. The display unit 112 may comprise a color Liquid Crystal Display (LCD) and an Active Matrix Organic Light Emitting Diode (AMOLED), etc., or another type of thin-film technology display screens. The display unit 112 includes a touch input device. When the display unit 112 is applied to a touch input type portable terminal, the display unit may be used as an input device. The display unit 112 reproduces sharing information of data reproduced from the peripheral terminal and outputs the same information as that of the peripheral terminal.

The communication unit 114 transmits and receives a Radio Frequency (RF) signal of a data which is input and output through an antenna (not illustrated). For example, in a transmitting process, data to be transmitted can be subject to a channel-coding process and a spreading process, and then the data is transformed to an RF signal. In a receiving process, the RF signal is received and transformed to a baseband signal, and the base-band signal is subject to a de-spreading process and a channel-decoding process, thereby restoring the data. The artisan should understand and appreciate that protocols other than spread spectrum technology are compatible with the present invention. Also, the communication unit 114 transmits and receives certain authentication information for a sharing process and sharing information of sharing data according to an exemplary embodiment of the present invention.

The functions of the sharing unit 102, the application analyzer 104, and the sharing information generator 106 may be performed by the controller 100 of the portable terminal. However, the present invention includes the controller 100, the sharing unit 102, the application analyzer 104, and the sharing information generator 106 which are exemplary configurations for the convenience of explanation and the scope of the claimed invention is not limited to those examples shown and described. It will be understood by those skilled in the art that various changes in form and details may be made therein without departing from the spirit and scope of the present invention. For example, all of them may be composed to be processed in the controller 100.

Figure 2:
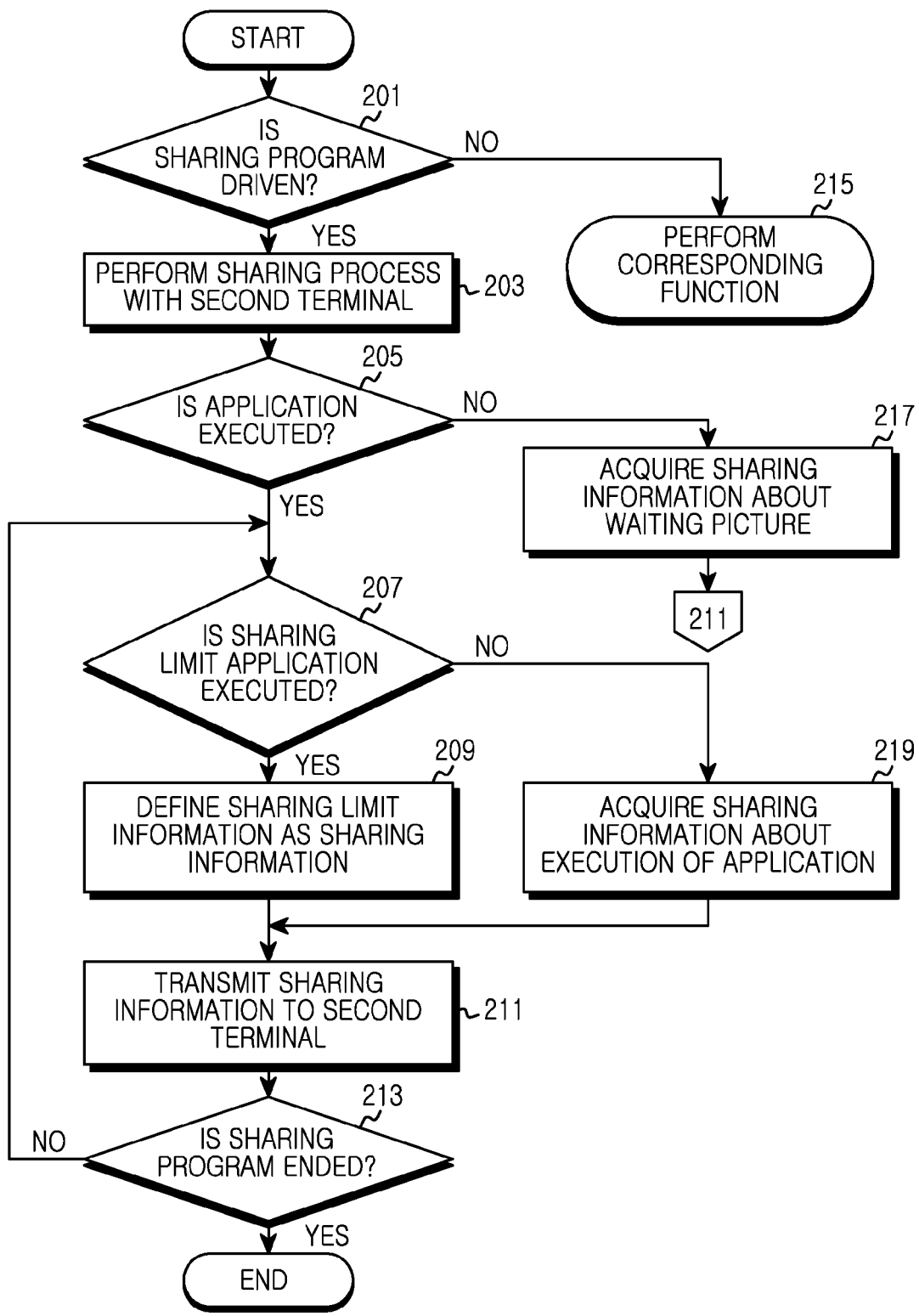
FIG. 2 is a flowchart illustrating exemplary operation a process of performing a picture control sharing function in a portable terminal according to an exemplary embodiment of the present invention.

FIG. 2 is a flowchart illustrating exemplary operation of a process of performing a picture control sharing function in a portable terminal according to the present invention.

Referring now to FIG. 2, at step 201 the portable terminal verifies whether or not a sharing program is driven. Herein, the sharing program is a sharing program for sharing a video data and an audio data reproduced from a peripheral terminal, controlling functions of the peripheral terminal, or providing a video data or an audio data reproduced from the portable terminal.

If the sharing program is not driven in step 201, the portable terminal proceeds to step 215 and performs a corresponding function (e.g., a waiting mode).

On the other hand, if at step 201 the sharing program is driven, the portable terminal performs step 203 and performs a sharing process with a second terminal which is positioned with communicative range. In other words, the portable terminal may exchange certain authentication information with the second terminal and may perform the sharing process.

The portable terminal then performs step 205 and verifies whether or not an application is executed. At this time, because the portable terminal performs the sharing process with the second terminal (i.e. peripheral terminal 115), an operation of the portable terminal is shared with the second terminal. For this reason, the portable terminal verifies whether or not the application to be shared with the second terminal has been executed.

If at step 205 the application is not executed, the portable terminal performs step 217 and acquires sharing information about a waiting picture. The portable terminal then performs step 211 and transmits the acquired sharing information to the second terminal. Herein, the sharing information may be video information and audio information of the portable terminal. Assuming that the portable terminal does not execute the application and maintains a waiting state, the portable transmits the sharing information about the waiting picture to the second terminal (peripheral terminal 115).

On the other hand, if at step 205 the application is executed, the portable terminal proceeds to step 207 and verifies whether a sharing limit application (i.e. non-shared application) is executed. Herein, the sharing limit (non-shared) application comprises an application authorized for use of only a specific user. The non-shared application may comprise a charged application, a DRM setup application, etc. The aforementioned non-shared application may be used for only the specific user. However, when a non-shared application authorized for use of only a portable terminal is executed at the portable terminal which is being shared with the peripheral (second) terminal, there is a problem in that the shared second terminal may verify the executed application authorized for use of only the portable terminal (i.e. the first portable terminal 10). In order to solve the aforementioned problem, the portable terminal verifies whether an application executed in a sharing state is the non-shared application.

If the sharing limit (non-shared) application is not executed in step 207, the portable terminal proceeds to step 219 and acquires sharing information about the application executed in step 205. In other words, the portable terminal acquires video information, audio information, etc. about the currently executed application.

On the other hand, if at step 207 the sharing limit (non-shared) application is executed, the portable terminal performs step 209 and defines sharing limit information as sharing information. Stated another way, the portable terminal provides the sharing information as the sharing limit information to prevent the sharing limit (non-shared) application from being reproduced at the shared second terminal. Herein, the sharing limit information may be classified into video sharing limit information and audio sharing limit information. The video sharing non-shared information is for limiting output video of the second terminal and may be a mosaic picture, a black picture, etc.

The audio sharing non-shared information is for limiting output audio of the second terminal and may be muted audio information, audio information replaced with a specific sound, etc.

As described above, the portable terminal which acquires the sharing information about the waiting picture, the sharing information about the executed application, and the sharing information replaced with the non-shared information proceeds to step 211 and transmits the acquired information to the second (peripheral) terminal with which it is being shared.

The portable terminal proceeds to step 213 and verifies whether the sharing program is ended.

If the sharing program is not ended in step 213, the portable terminal performs the processing from step 207 again.

On the other hand, if the sharing program is ended in step 213, the portable terminal ends the operation of FIG. 2.

Figure 3:
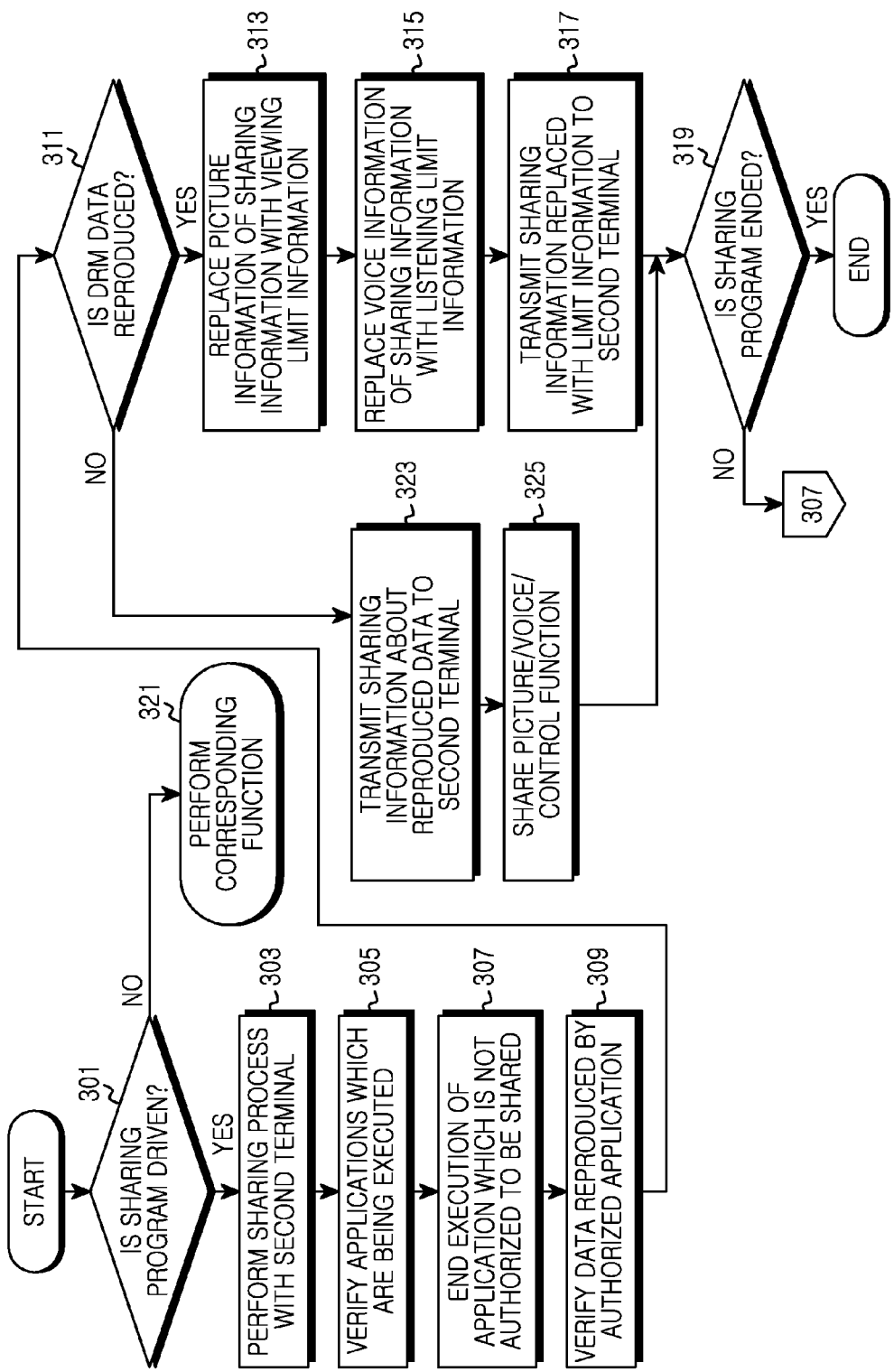
FIG. 3 is a flowchart illustrating exemplary operation of a process of performing a picture control sharing function in a portable terminal according to an exemplary embodiment of the present invention.
Figure 4B:
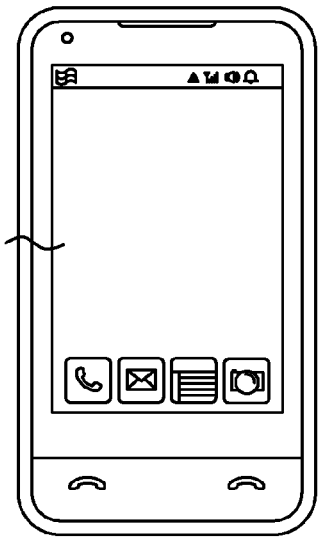
FIG. 4 illustrates pictures for executing a sharing program in a portable terminal according to an exemplary embodiment of the present invention.
Figure 4D:
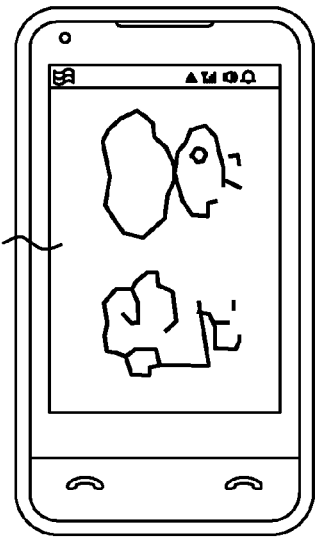
Figure 4A:
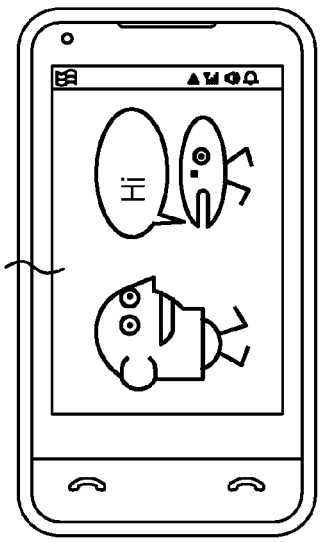
Figure 4C:
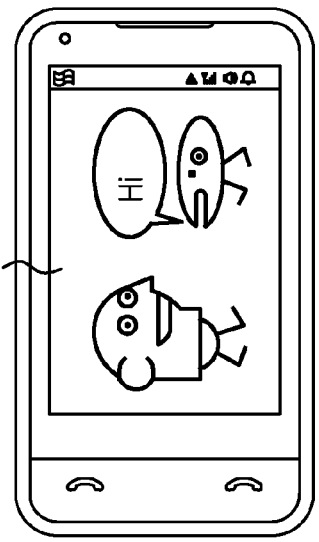

FIG. 3 is a flowchart illustrating a process of performing a picture control sharing function according to an exemplary embodiment of the present invention.

Referring now to FIG. 3, the portable terminal verifies whether a sharing program is driven in step 301. Herein, the sharing program is a sharing program 10 for sharing a video data and an audio data reproduced from a peripheral terminal 115, controlling functions of the peripheral terminal, or providing a video data or an audio data reproduced at the portable terminal to the peripheral terminal 115.

If at step 301 the sharing program is not driven, the portable terminal performs step 321 and performs a corresponding function (e.g., a waiting mode).

On the other hand, if the sharing program is driven in step 301, the portable terminal proceeds to step 303 and performs a sharing process with a second terminal which is positioned around it. That is, the portable terminal may exchange certain authentication information with the second terminal and may perform the sharing process.

With continued reference to FIG. 3, the portable terminal performs step 305 and verifies applications which are being executed. The portable terminal subsequently performs step 307 and ends execution of an unauthorized application.

Herein, the unauthorized application is an application incapable of being simultaneously executed with the sharing program and is an application which is not authorized to be shared.

The portable terminal then performs step 309 and verifies data reproduced by an authorized application. The portable terminal next performs step 311 and verifies a kind of the reproduced data. Herein, the portable terminal verifies whether the authorized application reproduces a data in which DRM is set.

If a data in which the DRM is not set is reproduced in step 311, the portable terminal performs step 323 and transmits sharing information about the reproduced data to the second terminal. The portable terminal next performs step 325 and shares a picture/voice/control function. For example, when the portable terminal reproduces an audio data, it provides sharing information (voice information) of the audio data which is being reproduced to the second (peripheral) terminal such that a user of the second (peripheral) terminal also receives the same audio data. Also, when the portable terminal reproduces a video data, the portable terminal provides sharing information (voice information and picture information) about voice data and picture data of the video data which is being reproduced to the second terminal such that the user of the second (peripheral) terminal views the same video data. At this time, the portable terminal may perform a reproduction function of the video data or the audio data according to control of the second terminal (e.g., an end function of data reproduction).

On the other hand, if the data in which the DRM is set is reproduced in step 311, the portable terminal performs step 313 and replaces picture information of sharing information about the reproduced data with viewing non-shared information to prevent sharing of the data in which the DRM is set. Herein, the viewing non-shared information is picture information for preventing a data which is being reproduced at the portable terminal from being viewed by the user of the second (peripheral) terminal. The viewing non-shared information may be a mosaic picture, a black picture, etc.

With continued reference to FIG. 3, the portable terminal performs step 315 and replaces voice information of sharing information about the reproduced data with listening non-shared information to prevent sharing of the data in which the DRM is set. Herein, the listening non-shared information comprises voice information for preventing a data which is being reproduced at the portable terminal from being listened by the user of the second terminal. The listening non-shared information may be muted audio information, audio information replaced with a specific sound (e.g., a beep, a bell, etc.), etc.

The portable terminal then performs step 317 and transmits the sharing information replaced with the viewing non-shared information and the sharing information replaced with the listening non-shared information to the second terminal. The portable terminal performs step 319 and verifies whether the sharing program is ended. In general, there is a problem in that the second (peripheral) terminal shares the video data or the audio data reproduced from the portable terminal using the sharing information received through the sharing program and also shares the data in which the DRM is set. However, the second terminal which receives the sharing information replaced with the non-shared information according to the present invention not reproduces the sharing information of the data, in which the DRM is set, reproduced at the portable terminal but outputs the non-shared information.

If the sharing program is not ended in step 319, the portable terminal performs the processing from step 307 again.

On the other hand, if the sharing program is ended in step 319, the portable terminal ends the process of FIG. 3.

FIG. 4 illustrates pictures for executing a sharing program in a portable terminal according to an exemplary embodiment of the present invention.

Referring now to FIG. 4, the portable terminal may reproduce a previously-stored data or may reproduce a video data through a streaming service. Of course, the video data may be a data authorized for use of a specific user and may be a data authorized for use of all users.

A peripheral (second) terminal may simultaneously reproduce a video data which is being reproduced at the portable terminal according to execution of a sharing program. In other words, the portable terminal provides picture information and voice information of the reproduced video data to the peripheral (second) terminal. The peripheral (second) terminal which receives the information reproduces the received information.

In addition, the sharing program may control functions of the peripheral (second) terminal.

For example, as shown in FIG. 4, the portable terminal which reproduces the video data and the peripheral (second) terminal will be classified and described as follows.

First of all, as shown in (a) of FIG. 4, a video data reproduced at the portable terminal may also be reproduced simultaneously at the peripheral terminal.

An output picture of the portable terminal which reproduces the video data through the sharing program is shared with the peripheral (second) terminal.

In other words, if the peripheral (second) terminal is not connected with the portable terminal which reproduces the video program through the sharing program, it outputs a waiting picture 402 as shown in (b) of FIG. 4 or outputs information about an operation which is being previously performed.

On the other hand, if the peripheral (second) terminal is connected with the portable terminal which reproduces the video data through the sharing program, the peripheral (second) terminal outputs the same picture 404 as the picture 400 of the portable terminal which reproduces a video data shown in (a) of FIG. 4, as shown in (c) of FIG. 4.

In other words, the portable terminal provides picture information and voice information of the reproduced data to the peripheral (second) terminal, and the peripheral (second) terminal reproduces the received information to share the picture information between them.

As described above, if the picture information is shared using the sharing program, there is a problem in that a reproduction picture of a data authorized for use of only a specific user is also shared.

In other words, if a data in which DRM is set to be reproduced at only the portable terminal is reproduced, there is a problem in that it is impossible to reproduce the data in which the DRM is set at the peripheral (second) terminal, yet it is possible to share the reproduction picture through the sharing program.

In order to solve the aforementioned problem, the portable terminal analyzes data reproduced while it shares a picture with the peripheral (second) terminal and verifies whether a data authorized for use of only the specific user is reproduced.

If the data authorized for use of only the specific user is reproduced, the portable terminal replaces picture information and voice information of the reproduced data with information which a user of the peripheral (second) terminal may not view or listen to and provides the replaced information.

For example, when the portable terminal wants to reproduce a paid Internet lecture data in a status where the portable and the peripheral (second) terminal are sharing the picture information through the sharing program, the portable terminal replaces the picture information of the Internet lecture data with black picture information and replaces voice information of the Internet lecture data with a mute sound so that the peripheral (second) terminal cannot see what it is not authorized to see via the sharing program. Or, alternatively, the portable terminal replaces the picture information of the Internet lecture data with mosaic information and replaces the voice information of the Internet lecture data with the mute sound. For this reason, the peripheral (second) terminal displays a mute black picture (of the mosaic picture) as the picture information of the portable terminal. In other words, as shown in (d) of FIG. 4, the peripheral (second) terminal outputs the mute black picture or the mosaic picture 406 instead of the Internet lecture data reproduced at the portable terminal.

Also, when the portable terminal and the peripheral (second) terminal maintains a state where they share the picture information through the sharing program, the peripheral (second) terminal may control a data reproduction function of the portable terminal.

As described above, the present invention limits sharing of a data which is not authorized to be shared in the portable terminal which shares an output data in real time. The present invention replaces sharing information with non-shared information and provides the non-shared information when reproducing the data which is not authorized to be shared. The present invention ends reproduction of the data which is not authorized to be shared and prevents the reproduction of the data which is not authorized to be shared from being shared at the peripheral (second) terminal.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims. For instance, while the aforementioned examples referred to a black display or a mosaic output by the display of the peripheral terminal when the peripheral terminal is not authorized to output certain video or audio data of the portable terminal, any type of display can be provided as a changeable default (e.g. test pattern, wallpaper, screensaver, etc.). In addition, music could be played instead of muting the sound, or, for example, audio data informing a user of the peripheral (second) terminal that they are not authorized to share data currently being accessed by the portable terminal. Furthermore, in the appended claims the picture information may comprise any type of video data and voice information can comprise a type of audio information in addition to voice.

What is claimed is:

1. An apparatus for sharing data, comprising:
a communication unit; and
a processor, coupled to the communication unit, configured to:
control the communication unit to communicate with an external device;
determine a content that is being reproduced, the content including at least one of image data or sound data;
determine whether the content is permitted to be shared;
responsive to determining that the content is permitted to be shared, provide at least one of the image data or sound data included in the content to the external device;
responsive to determining that the content is not permitted to be shared, distort at least one of the image data or sound data included in the content, and provide the distorted at least one of the image data or sound data to the external device.

2. The apparatus of claim 1, further comprising a display screen, wherein reproducing the content includes displaying the image data on the display screen.

3. The apparatus of claim 1, wherein the determination of whether the content is permitted to be shared is made based on Digital Rights Management (DRM) data associated with the content.

4. The apparatus of claim 1, wherein the content is reproduced by a first software application and shared by a second software application, both the first software application and the second software application being executed by the processor.

5. The apparatus of claim 1, wherein the external device controls an operation of the processor.

6. The apparatus of claim 1, wherein distorting the image data includes generating a mosaic image.

7. The apparatus of claim 1, wherein distorting the sound data includes generating a mute sound.

8. A method of sharing information in a portable terminal, the method comprising:
establishing a communications session with an external device;
determining a content that is being reproduced, the content including at least one of image data and sound data;
determining whether the content is permitted to be shared;
responsive to determining that the content is permitted to be shared, providing at least one of the image data or sound data included in the content to the external device; and
responsive to determining that the content is not permitted to be shared, distorting at least one of the image data or sound data included in the content and providing the distorted at least one of the image data and sound data to the external device.

9. The method of claim 8,
the portable terminal includes a display screen, and reproducing the content includes displaying the image data on the display screen.

10. The method of claim 8, wherein the determination of whether the content is permitted to be shared is made based on Digital Rights Management (DRM) data associated with the content.

11. The method of claim 8, wherein the content is reproduced by a first software application and shared by a second software application, both the first software application and the second software application being executed by a processor of the portable terminal.

12. The method of claim 8, wherein the external device controls an operation of the portable terminal.

13. The method of claim 8, wherein distorting the image data includes generating a mosaic image.

14. The method of claim 8, wherein distorting the sound data includes generating a mute sound.

* * * * *

UNITED STATES PATENT AND TRADEMARK OFFICE
CERTIFICATE OF CORRECTION

| | | |
|---|---|---|
| PATENT NO. | : 9,253,641 B2 | Page 1 of 1 |
| APPLICATION NO. | : 13/409750 | |
| DATED | : February 2, 2016 | |
| INVENTOR(S) | : Yoon-Suk Choi et al. | |

It is certified that error appears in the above-identified patent and that said Letters Patent is hereby corrected as shown below:

In the Claims

Column 10, Claim 1, Lines 18-19 should read as follows:
--...external device; and responsive...--

Signed and Sealed this
Third Day of May, 2016

Michelle K. Lee
*Director of the United States Patent and Trademark Office*